W. J. MUSSER.
AUTOTRUCK.
APPLICATION FILED FEB. 28, 1914.
1,172,725.
Patented Feb. 22, 1916.
2 SHEETS—SHEET 1.
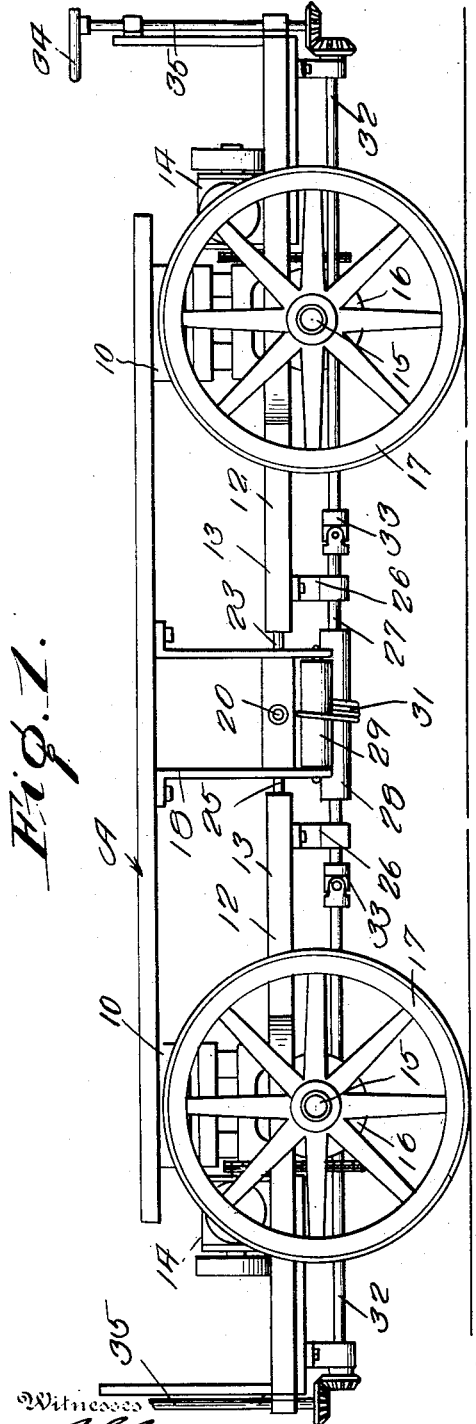
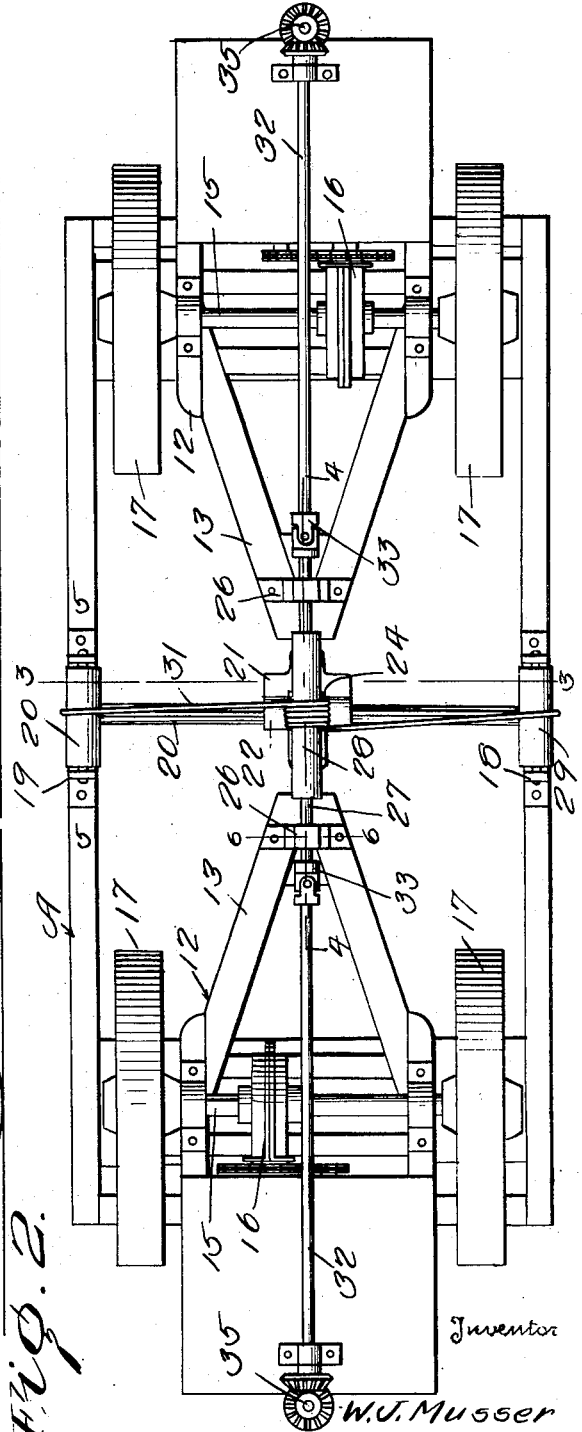

W. J. MUSSER.
AUTOTRUCK.
APPLICATION FILED FEB. 28, 1914.

1,172,725.

Patented Feb. 22, 1916.
2 SHEETS—SHEET 2.

Witnesses
B. J. Bramm
Henry T. Bright

Inventor
W. J. Musser

By Chandler Chandler
Attorney

UNITED STATES PATENT OFFICE.

WILLIAM J. MUSSER, OF ZEPHYRHILLS, FLORIDA.

AUTOTRUCK.

1,172,725. Specification of Letters Patent. Patented Feb. 22, 1916.

Application filed February 28, 1914. Serial No. 821,745.

*To all whom it may concern:*

Be it known that I, WILLIAM J. MUSSER, a citizen of the United States, residing at Zephyrhills, in the county of Pasco, State of Florida, have invented certain new and useful Improvements in Autotrucks; and I do hereby declare the following to be a full, clear, and exact description of the invention, such as will enable others skilled in the art to which it appertains to make and use the same.

This invention relates to motor vehicles and more particularly to those of the commercial type.

The object of the invention resides in the provision of a motor vehicle in which the front and rear axles are driven through the medium of separate motors, each of said axles being mounted to partake of a steering movement which is adapted to be imparted thereto simultaneously by the operation of a steering wheel at either end of the vehicle, such a structure being extremely advantageous in that it permits the vehicle to be moved out of a space too small to permit of turning.

A further object of the invention resides in the provision of a motor vehicle of the character referred to in which the use of springs may be dispensed with and ample movement of the axle in a plane extending transversely of the vehicle permitted to allow for inequalities in the road over which the vehicle is traveling.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 3:
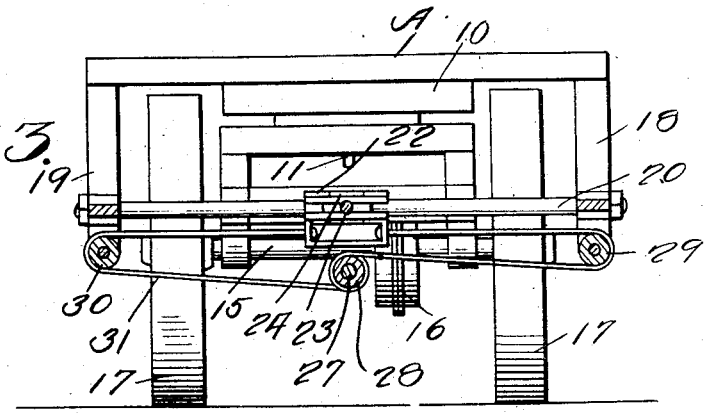
Figure 4:
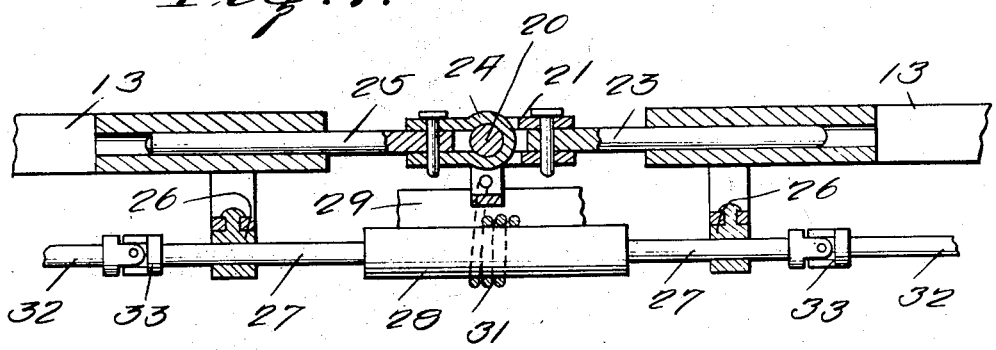
Figure 5:
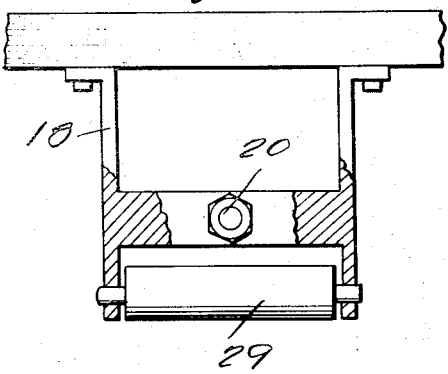
Figure 6:
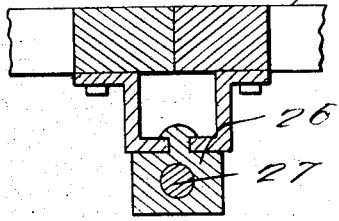

Figure 1 is a side elevation of a fragment of a motor vehicle constructed in accordance with the invention; Fig. 2, a bottom plan view of same; Fig. 3, a section on the line 3—3 of Fig. 2; Fig. 4, a section on the line 4—4 of Fig. 2; Fig. 5, a section on the line 5—5 of Fig. 2, and Fig. 6, a section on the line 6—6 of Fig. 2.

Referring to the drawing A indicates the frame of the vehicle which supports at each end transverse plates 10. Pivoted upon a bolt or pin 11 depending from each plate 10 for movement in a plane parallel to the frame A is a truck frame 12 having a V-shaped inner portion 13 and supporting at its outer end a suitable motor 14. Rotatably mounted on each truck frame 12 is a sectional axle 15 having incorporated therein a differential 16. Fixed on the ends of each axle 16 are traction wheels 17 of any desired type. The axles 15 are adapted to be rotated through the medium of connections with the adjacent motor 14.

Depending from the sides of the frame A between the axles 15 are brackets 18 and 19 which support a rod 20 extending transversely of the frame A. Slidable on the rod 20 is a U-shaped member 21 the arms of which are provided with tubular terminals 22 engaged around the rod 20. The member 21 has pivoted thereto a stem 23 which is rotatably engaged in the adjacent end of one of the truck frames 12. Slidably engaged on the rod 20 between the arms of the member 21 is a sleeve 24 having pivoted thereto a stem 25 rotatably engaged in the adjacent end of the other truck frame 12. Depending from the inner ends of the truck frame 12 respectively and pivotally mounted for rotation in a plane substantially parallel to the plane of the frame A are bearings 26. Loosely rotatable in the bearings 26 is a shaft 27 having an enlarged central portion 28 for a purpose that will presently appear. Journaled on the lower end of the brackets 18 and 19 and outwardly of the latter are rollers 29 and 30 respectively and traveling on these rollers 29 and 30 is an endless chain 31, said chain being also entwined about the enlarged central portion 28 of the shaft 27. By this construction it will be apparent that as the shaft 27 is rotated the inner ends of the truck frames 12 will be moved simultaneously in the same direction. Journaled on each truck frame 12 and extending longitudinally thereof is a steering shaft 32 which is connected to the adjacent end of the shaft 27 by means of a universal joint 33. Each of the steering shafts 32 is adapted to be rotated through the medium of a steering wheel 34 mounted upon a steering column 35 carried by the corresponding truck frame 12, it being noted that the steering wheel 34 is operatively connected with the corresponding steering shaft 32 in any desired manner.

From the foregoing construction it will be apparent that when either steering wheel 34 is operated the shafts 27 will be rotated to effect pivotal movement of the truck frame 12 and a desired steering movement of the axles 15. By providing steering means operable from either end of the vehicle it will be obvious that the direction in which the vehicle is moving can be reversed without the necessity of turning the vehicle.

It will be further apparent that owing to the pivoted journaled bearings of the shaft 27 and the pivotal mountings of the stems 23 and 25 together with the rotative engagement of said stems with the truck frames said truck frames can readily move in a plane at right angles to the frame A in response to inequalities of the road over which the vehicle is traveling.

What is claimed is:—

1. In a motor vehicle, the combination of a chassis frame, a truck frame pivoted to each end of said chassis frame for movement in a plane parallel to the chassis frame, wheeled axles carried by said truck frames respectively, brackets depending from respective sides of the chassis frame, a rod supported by said bracket and disposed between the inner ends of the truck frames, members slidably engaged on said rod, stems pivoted to said members respectively and slidably engaged in respective truck frames, journaled bearings pivoted on respective truck frames, a shaft journaled in said bearings, rollers journaled on said brackets respectively, an endless flexible member traveling on said rollers and entwined about said shaft whereby the rotation of said shaft will move the inner ends of the truck frames simultaneously in the same direction, and means operable from either end of the vehicle for effecting the rotation of said shaft.

2. In a motor vehicle, the combination of a chassis frame, a truck frame pivoted to each end of said chassis frame for movement in a plane parallel to the chassis frame, wheeled axles carried by said truck frames respectively, brackets depending from respective sides of the chassis frame, a rod supported by said bracket and disposed between the inner ends of the truck frames, members slidably engaged on said rod, stems pivoted to said members respectively and slidably engaged in respective truck frames, journaled bearings pivoted on respective truck frames, a shaft journaled in said bearings, rollers journaled on said brackets respectively, a steering shaft journaled on each truck frame, a universal joint connecting each steering shaft with the adjacent end of the first named shaft, and means carried by each truck frame for effecting a rotation of the corresponding steering shaft.

In testimony whereof, I affix my signature, in the presence of two witnesses.

WILLIAM J. MUSSER.

Witnesses:
 HENRY T. BRIGHT,
 FRANK S. APPLEMAN.